United States Patent
Campbell et al.

(10) Patent No.: US 8,091,915 B2
(45) Date of Patent: Jan. 10, 2012

(54) ANIMATED NOVELTY DEVICE

(75) Inventors: Brian J. Campbell, Clermont, FL (US); Daniel J. Chesnicka, Auburndale, FL (US); Mark J. McIntyre, Ocoee, FL (US)

(73) Assignee: Evoke Ventures, LLC, Celebration, FL (US)

( * ) Notice: Subject to any disclaimer, the term of this patent is extended or adjusted under 35 U.S.C. 154(b) by 0 days.

(21) Appl. No.: 11/733,972

(22) Filed: Apr. 11, 2007

(65) Prior Publication Data
US 2007/0242471 A1 Oct. 18, 2007

(51) Int. Cl.
*B60D 1/60* (2006.01)
*A63H 13/00* (2006.01)

(52) U.S. Cl. .................... 280/507; 426/330
(58) Field of Classification Search ............. 280/507; 446/288, 175, 199, 232, 330, 331, 333, 335, 446/338; 362/485; 40/591; D12/162
See application file for complete search history.

(56) References Cited

U.S. PATENT DOCUMENTS

| | | | | |
|---|---|---|---|---|
| 2,225,221 A | * | 12/1940 | Toyojiro | 340/489 |
| 3,851,418 A | * | 12/1974 | Barlow et al. | 446/338 |
| 4,582,317 A | * | 4/1986 | Provenzano, Jr. | 472/70 |
| 4,775,351 A | * | 10/1988 | Provenzano, Jr. | 446/175 |
| D317,890 S | | 7/1991 | Bachmann | |
| D336,880 S | | 6/1993 | Drummond | |
| 5,324,225 A | * | 6/1994 | Satoh et al. | 446/175 |
| D359,018 S | | 6/1995 | Thigpen | |
| 5,603,178 A | | 2/1997 | Morrison | |
| 6,017,261 A | * | 1/2000 | Wachtel | 446/301 |
| 6,053,627 A | | 4/2000 | Vo et al. | |
| 6,102,424 A | * | 8/2000 | Cole et al. | 280/507 |
| 6,197,390 B1 | | 3/2001 | LaVite | |
| 6,285,924 B1 | * | 9/2001 | Okamoto et al. | 701/1 |
| D452,204 S | * | 12/2001 | Wrob | D12/162 |
| D454,524 S | * | 3/2002 | Wrob | D12/162 |
| 6,357,899 B1 | | 3/2002 | Craven | |
| 2002/0108292 A1 | * | 8/2002 | Pearce | 43/26.2 |

FOREIGN PATENT DOCUMENTS

| | | | |
|---|---|---|---|
| AU | 8767604 A | * | 7/1987 |
| GB | 730495 A | * | 5/1955 |

* cited by examiner

*Primary Examiner* — Anne Marie M Boehler
*Assistant Examiner* — Daniel Yeagley

(57) ABSTRACT

An animated novelty device for mounting on a ball of a trailer hitch on a vehicle, the device including an electric motor for imparting motion to selected elements of the device. The motor is electrically connected to the vehicle braking system whereby the device is set in motion by energizing the vehicle brakes.

13 Claims, 6 Drawing Sheets

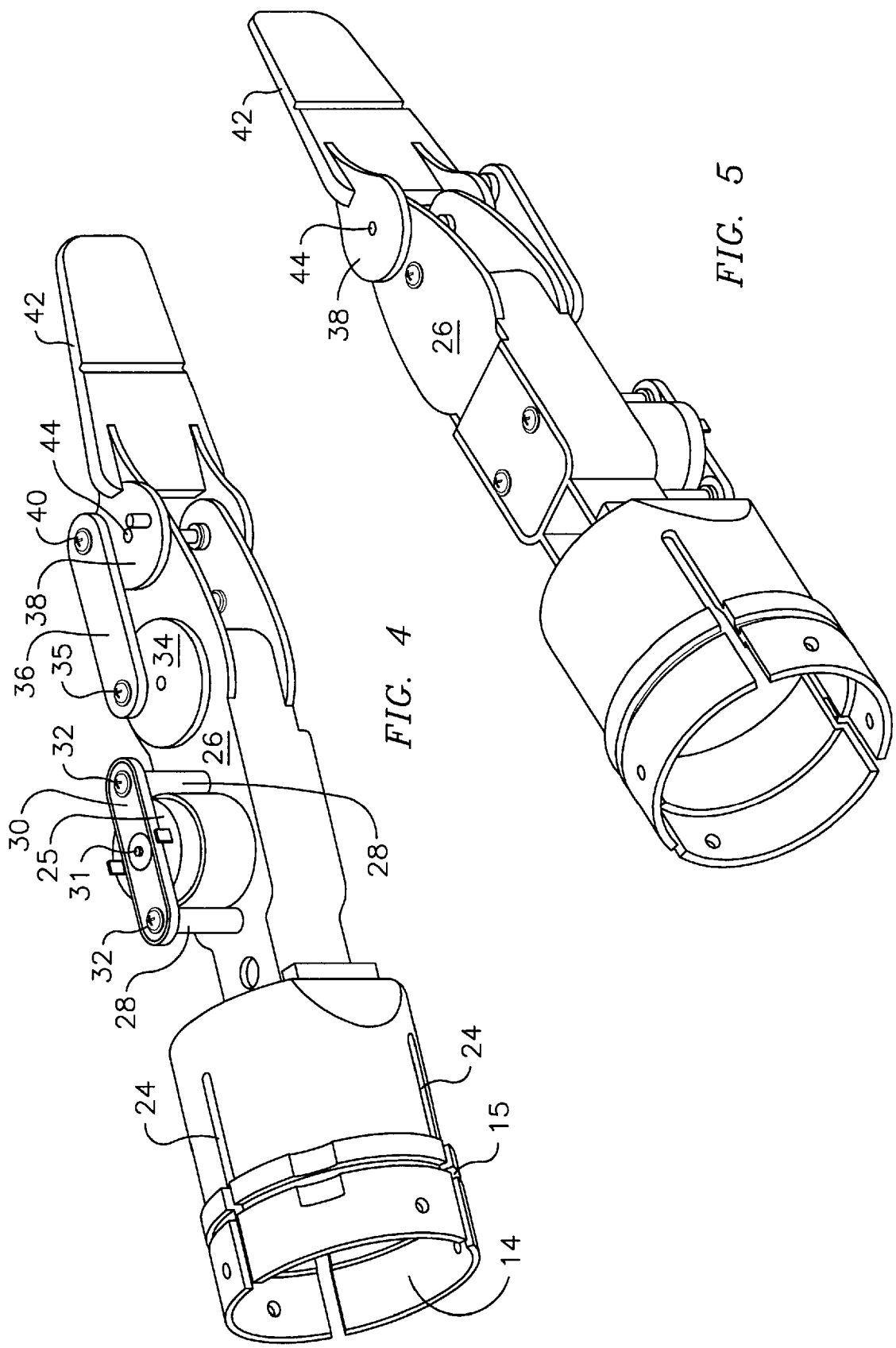

ANIMATED NOVELTY DEVICE

SPECIFIC DATA RELATED TO THE INVENTION

This application claims the benefit of U.S. Provisional Application No. 60/791,336 filed Apr. 12, 2006.

The present invention relates to an animated novelty device for mounting on a ball of a trailer hitch on a vehicle, and, more particularly, to such an animated novelty device including an electric motor for importing motion to the device upon application of brakes of the vehicle.

BACKGROUND OF THE INVENTION

There are numerous products available to cover or decorate a ball on a conventional trailer hitch of a vehicle. Typically, such trailer hitches are found on the rear bumper of a pick-up truck or SUV. Examples of such trailer hitch covers are shown in U.S. Design patents D359,018; D317,890 and D336,880. In some instances, the ball is part of a removable trailer hitch and other types of devices are used to hide or decorate the portion of the hitch that remains with the vehicle when the ball holding portion is removed. An example of such a cover is shown in U.S. Pat. No. 6,053,627.

SUMMARY OF THE INVENTION

The present invention is directed to an animated novelty device that functions as a cover for a trailer hitch while providing visual interest. In a preferred form, the animated novelty device may be constructed in the shape of a fish or animal and include an opening for receiving a ball of a trailer hitch so as to cover or conceal the ball. The animated device may be referred to herein as a device or cover and such terms are considered to be synonymous for purpose of this description. The device includes an electrically operated mechanism that, when actuated, imparts motion to selected parts of the device. The mechanism may include an electric motor that is coupled to various gears and levers such that the motor is able to move the gears and levers in order to impart motion or animation to the device. While the device is described in one form as being adapted to fit over a ball of a trailer hitch, it will be recognized that the cover could be attached to a vehicle bumper or to the portion of a trailer hitch that remains when a ball is removed, such as in the aforementioned U.S. Pat. No. 6,053,627.

BRIEF DESCRIPTION OF THE DRAWINGS

For a better understanding of the present invention, reference may be had to the following detailed description taken in conjunction with the accompanying drawing in which:

FIG. 4 shows one arrangement of internal component assembly for the fish of FIG. 2;

FIG. 5 is a view of the reverse side of the component assembly of FIG. 4;

DETAILED DESCRIPTION OF A PREFERRED EMBODIMENT

Figure 1:
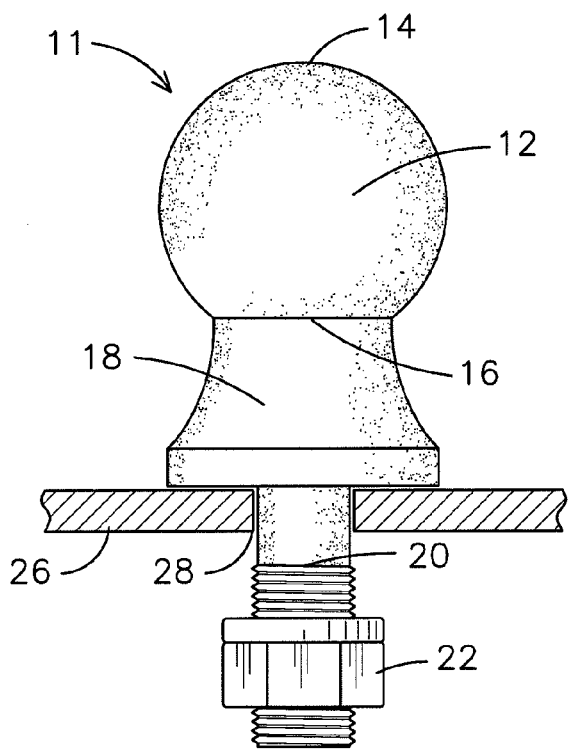
FIG. 1 illustrates a typical ball type of trailer hitch with which the present invention may be used.

A typical vehicle trailer hitch-ball structure 11, as shown in FIG. 1, is comprised of an upper ball having an upper surface and a lower surface that is integrally molded with a frame attachment platform from where extends a threaded mounting rod. The threaded mounting rod is inserted through a frame bore that is located on a rear vehicle frame. The vehicle trailer hitch-ball structure is tightened against the frame by means of a mounting nut. The device of the present invention, in a preferred embodiment, is particularly designed with an opening or receptacle that fits over the ball to both conceal and provide a cover for the ball.

Figure 2:
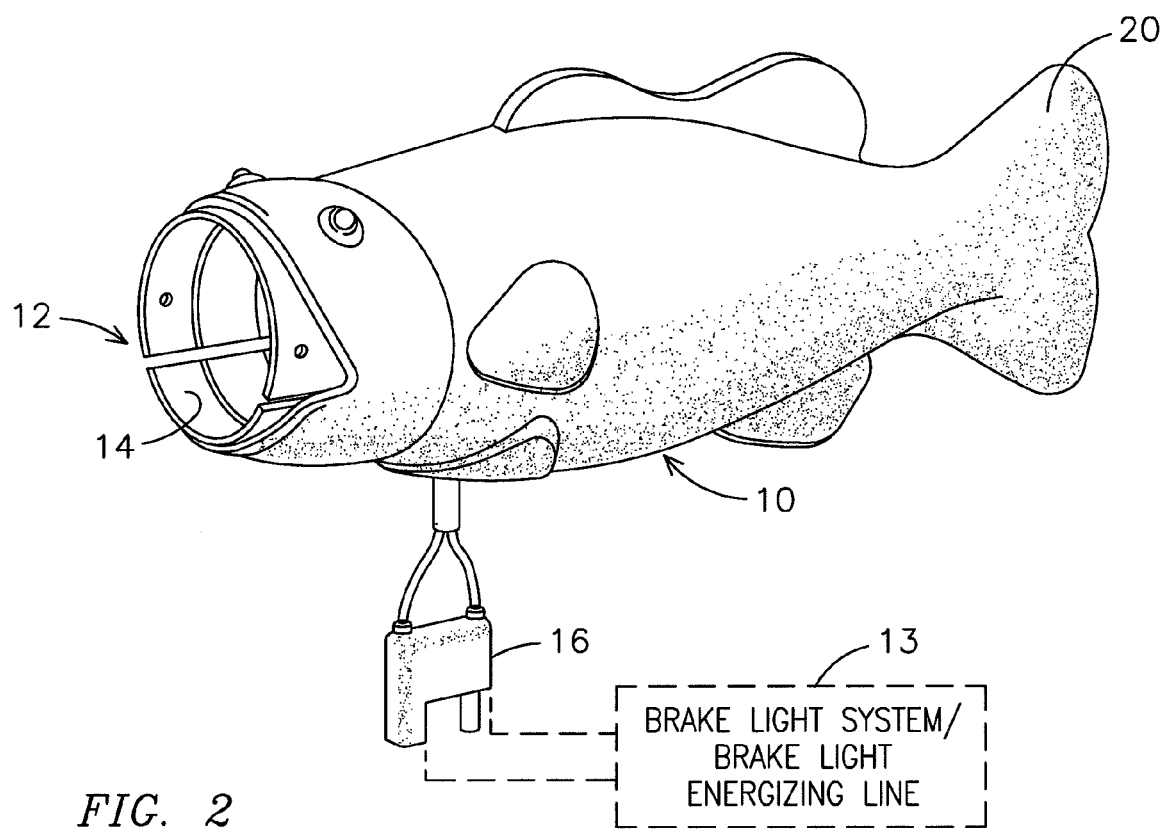
FIG. 2 shows one form of the present invention in which the cover is structured in the form of a large mouth bass fish.

Referring to FIG. 2, there is shown one form of the present invention in which the novelty device 10 is structured in the form of a large mouth bass fish. The mouth 12 of the fish is opened and includes an elastic receptacle 14 that is adapted to fit over the ball of the hitch ball structure 11 of a trailer hitch on the back of the vehicle thereby functioning as a cover for the ball. The liner 14 may be provided in different sizes to fit different size ball diameters. There is also shown a connector 16 for electrically connecting the fish 10 to a brake light system 13 of the vehicle. The connector 16 is preferably a conventional connector of the type commonly used to connect electrical brake systems of boats or trailers that are coupled to the trailer hitch so that the connector is provided with power for energizing lights on the boat or trailer when the braking system on the vehicle is energized.

Figure 3:
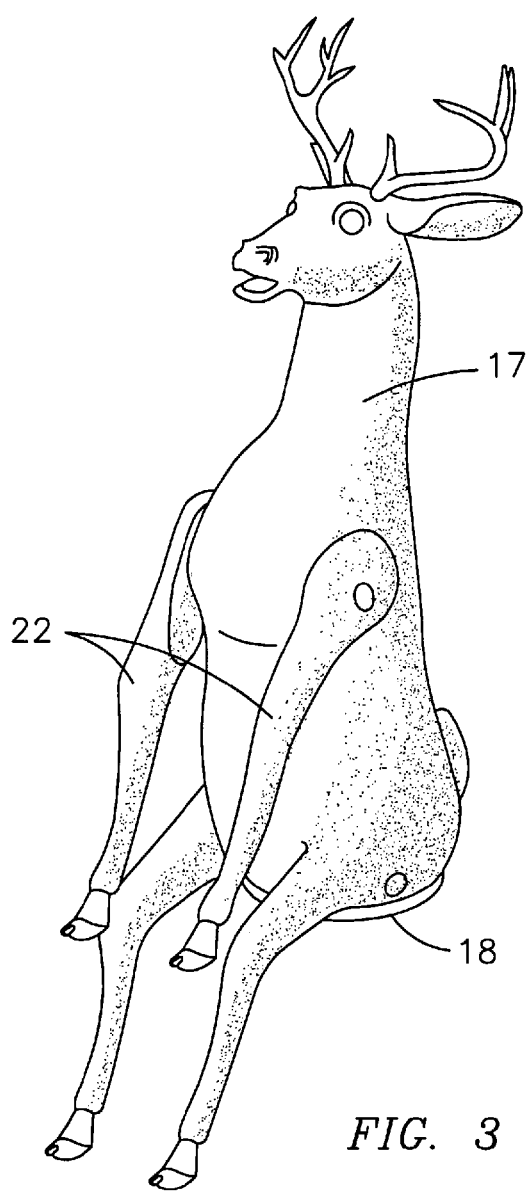
FIG. 3 shows another form of the cover of the present invention in the appearance of a deer.

FIG. 3 shows another form of the animated novelty device, in this instance appearing as a deer 17. The deer 17 also incorporates a receptacle 18 similar to the receptacle 14 in FIG. 1 which enables the deer to be positioned in a seated position on the hitch ball structure 11 of a trailer hitch. Although not shown in FIG. 3, the deer is also provided with a connector of the type shown at 16 in FIG. 2 to enable connection of the electrical system of the deer to the brake light system of a vehicle.

In both FIG. 2 and FIG. 3, the animated novelty devices are provided with internal electric motors which enable various portions of the devices to move upon application of the brakes of the vehicle. In the case of the fish 10 in FIG. 2, the electric motor is connected so as to cause the tail 20 of the fish to waggle so that the fish has a swimming motion. In the case of the deer 17 shown in FIG. 3, the motor is connected so as to drive the fore limbs 22 of the deer and cause them to be raised into an upright position such that the deer appears to be raising its fore limbs into a "don't shoot or surrender" position. It will of course be recognized that other movements of the devices could also be implemented within the scope of the invention.

Turning now to FIG. 4, there is shown the internal arrangement of components in the fish 10 of FIG. 2. The internal receptacle 14 being a self-latching hitch ball receiver member which seats on the ball of the trailer hitch of the vehicle can be seen as being formed as a cup- like structure with a plurality of slots 24 which allow the sides of the structure to expand and contract so that the ball can be inserted and maintained in frictional engagement with the member 14. The receptacle 14 is preferably a molded plastic structure with the plastic memory serving to provide the gripping force on the hitch ball structure 11. However, additional holding strength may be provided by use of a metal band (not shown) placed in the groove 15 encircling the receptacle.

Connected to the back of the member 14 is a gear box 26 to which there is attached an electric motor 25. The motor is held in place against the gear box 26 by means of a pair of stanchions 28 which support a cross member 30 that is held to the gear box 26 by screws 32 passing through the ends of the member 30 and the stanchions 28 and threadedly engaged into the gear box 26. One end of the rotating shaft of the motor 25 passes through a center hole 31 in the support 30 so as to maintain the motor in a fixed position. The motor 25 is powered by electrical connection (not shown) from the connector 16 of FIG. 2 in a manner well known in the electrical art. Since the connector 16 is adapted for connection to the brake light system of a vehicle, the motor 25 is only energized when the vehicle brake system is actuated.

Within the gear box 26, the rotating rotor of the motor 25 is connected to a set of gears (shown in detail in FIG. 6) that convert the rotation of a rotor of the motor into an appropriate speed and torque at an output shaft of the gear box for rotating a drive wheel 34. The drive wheel 34 is merely a circular member driven by the motor 25 through the gear box but has an off-set point at 35 through which a lever arm 36 is attached to the wheel 34. In the illustrated embodiment, the lever arm 36 is attached by means of a screw passing through an end of the arm and into the off-set point on the wheel 34. The opposite end of the arm 36 is also connected to a generally push and pull wheel 38 at an off-set point on the push and pull wheel 38 by means of a screw 40. The push and pull wheel 38 is attached to a plate 42 which fits within the tail of the fish 10. As can be seen, when the wheel 34 rotates about its center point, it causes the lever arm 36 to move in a "to and fro" motion as it rotates about the center point of the wheel 34 so as to cause the lever arm 36 to alternately push and pull the wheel 38 to create an oscillating motion of the wheel 38 about its center point 44. This oscillating motion of wheel 38 is transmitted to the plate 42 as a waving motion which creates the waggle in the tail 20 of fish 10.

FIG. 5 shows a bottom view of the structure of FIG. 4 illustrating how the plate 42 is symmetrical in its attachment to the end of the gear box 26.

Figure 6:
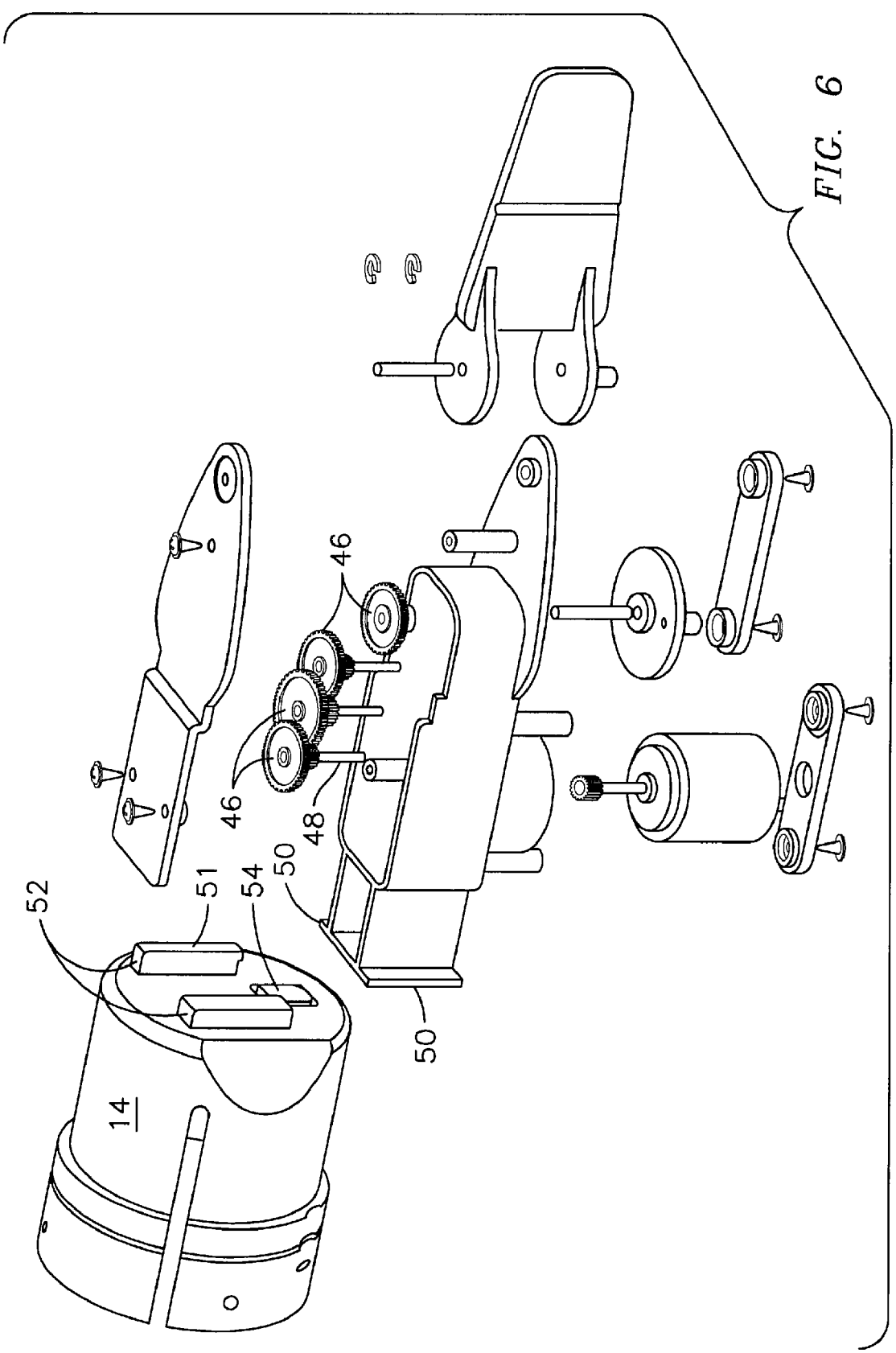
FIG. 6 is an exploded view of the component assembly of FIG. 4.

FIG. 6 is an exploded view of the movement generating mechanism and gear box of FIG. 4. As can be seen, the gear box 26 holds a sequence of gears 46 which reduce the speed of the motor 25 to impart a slow motion to the plate 42. Each of the gears 46 fit within the gear box by means of their respective shafts 48 residing in holes formed in the box 26. Gear boxes for coupling a high speed motor shaft to an output shaft 48 turning at a much lower speed are well known in the art and such gear box as is illustrated at 26 is shown in an exploded view only to indicate the general functionality of the box. Various arrangements of gears to achieve the desired reduced output shaft speed with increased torque can be used in box 26 within the scope of the present invention. In the illustrated form, the gear box 26 has a pair of outwardly extending flanges 50 which fit in sliding engagement into a pair of raised slots 51 defined by opposed flanges 52 on the back of the ball receiving member 14. A latch 54 maintains the gear box in position within the flanges 52 and also provides a means for readily removing the receptacle 14 and exchanging the receptacle to adapt the device for attachment to different size trailer hitch balls.

Figure 7:
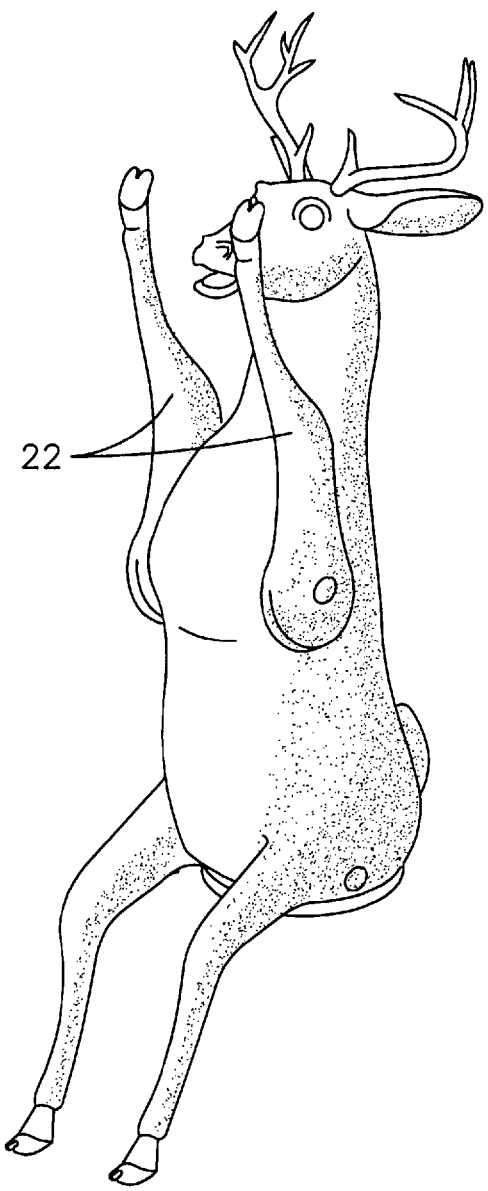
FIG. 7 shows another form of the invention configured to appear as a deer.

The deer 17 of FIG. 3 operates in much the same way as the fish 10 in FIG. 2. Referring to FIG. 7 and comparing FIG. 7 to FIG. 3, it can be seen that one movement of the deer is to change the position of the fore limbs 22 from the down position shown in FIG. 3 to an up position as shown in FIG. 7. As with the fish illustrated in FIG. 2, the motion of the deer's fore limbs is controlled by an electric motor driving a gear box with a cam arrangement that causes the fore limbs 22 to oscillate between the down position and the up position as long as the electric motor is energized.

Figure 8:
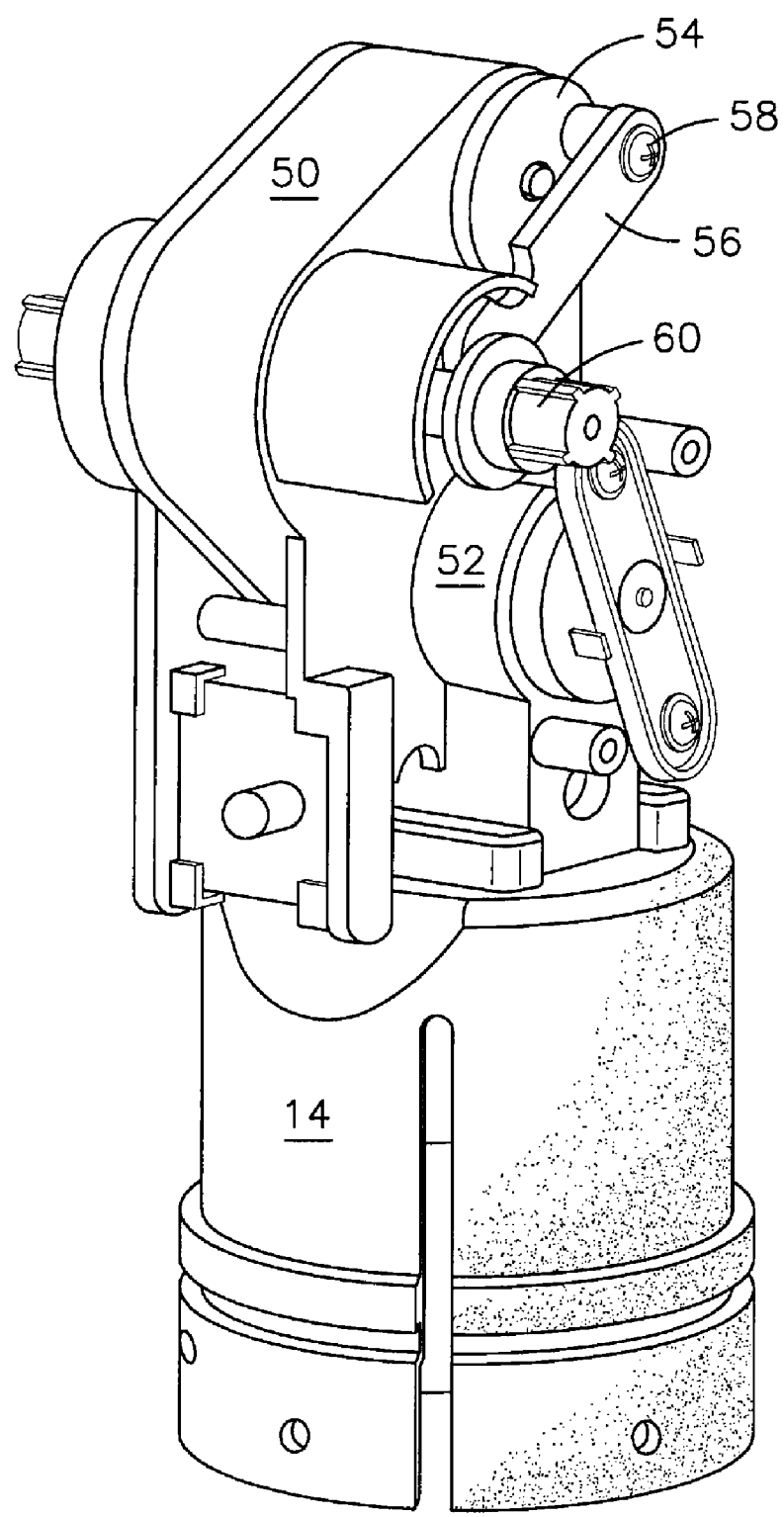
FIG. 8 shows one arrangement of internal component assembly for the deer of FIG. 7.

Referring to FIG. 8, there is shown a perspective view of the operating mechanism used in the deer of FIG. 3. The gear box indicated at 26 is connected to the trailer hitch ball receiving member 14 which is structured in the same manner as the member 14 of FIG. 4. The gear box 26 may be provided with the same attachment mechanism as shown in FIG. 6 to hold the gear box to the member 14. The electric motor 25 is attached to the gear box 26 in the same manner as the motor 25 is attached to the gear box 26 of FIG. 4. While the shape of the gear box 26 varies somewhat from the shape of gear box 26, the variation in shape is only necessitated by the particular configuration of the deer versus the fish and the fact that the deer's front fore limbs are moved rather than another portion of its anatomy. As described with regard to the gear box 26 of FIG. 6, the particular arrangement of gears is only shown to be representative of a gear box that can reduce input shaft speed to a desired output shaft speed and such gearboxes are well known in the art and the arrangement of gears is not considered part of the present invention.

Figure 9:
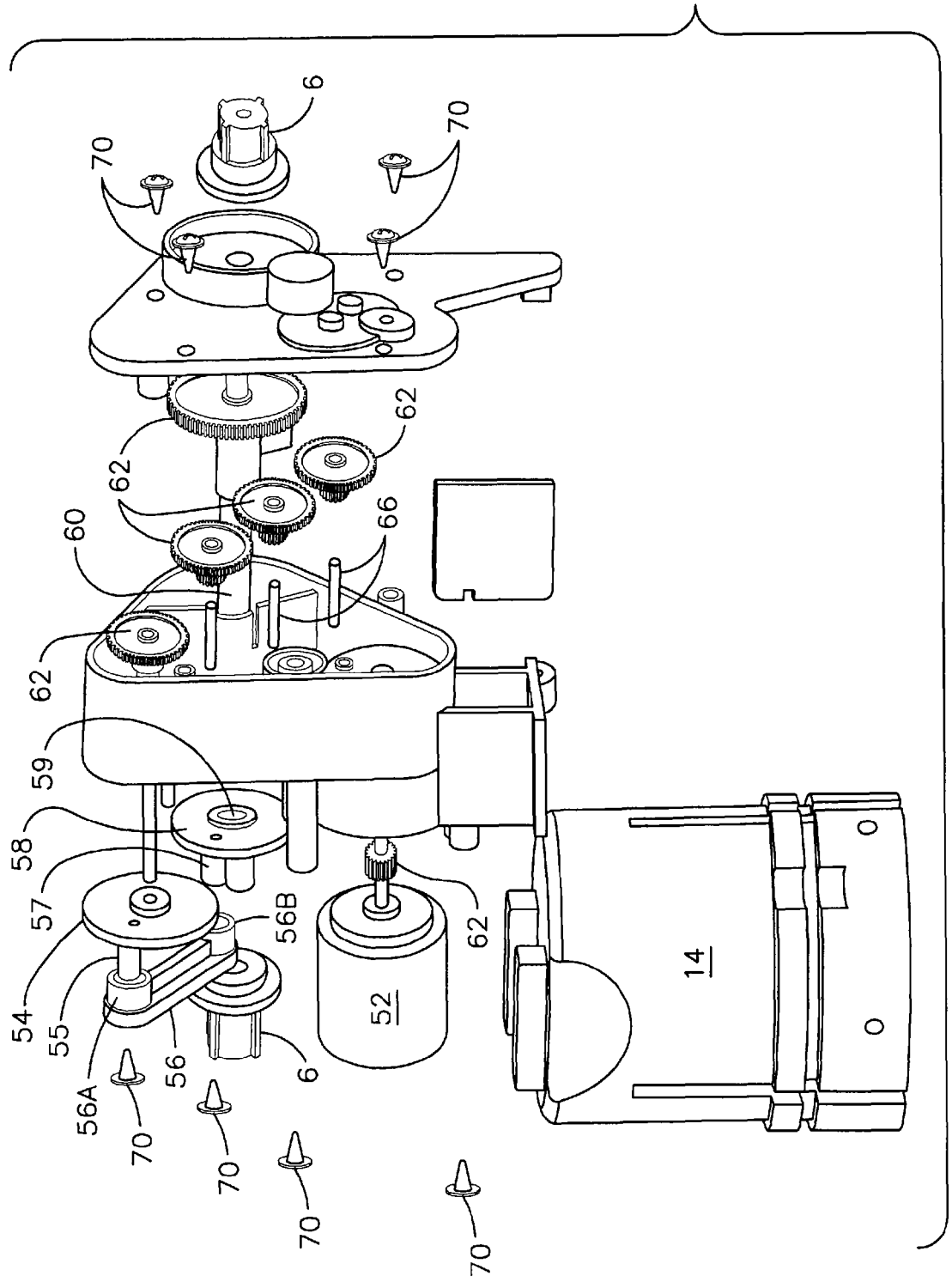
FIG. 9 is an exploded view of the component assembly of FIG. 8.

FIG. 9 is an exploded view of the drive and attachment mechanism of FIG. 8. The motor 25 drives the gears 62 within the gear box 26 to cause rotation of a wheel 34. A pin 55 extends from adjacent a radially outer edge of the wheel 34. A connector arm 56 has one end 56A rotatably coupled to the pin 55 and another end 56B rotatably coupled to a pin 57 protruding from adjacent a radially outer edge of another wheel 58. Rotation of the wheel 34 causes a reciprocating motion of the connector arm end 56B so that an oscillating motion is imparted to the wheel 58 about its center 59. An axle 60 is connected to wheel 58 through an opening at center 59. The axle 60 extends through the gear box 26 and terminates in a pair of end caps 64 on each end. The caps 64 provide a connection to the fore limbs 22 of the deer 17 so that as the wheel 58 is driven in an oscillating motion, the fore limbs move up and down. The gears 62 provide the speed control reducing the speed of motor 25 down to an appropriate speed of wheel 34 for movement of the fore limbs 22 of the deer 17. Each of the gears 62 ride on respective ones of the shafts 66. Supports for the shafts 66 are incorporated into the housing of the gear box and gear box cover 68 in a manner well known in the art. The exploded view also shows a number of screws 70 that are used to assemble the gear box, cover and to hold the caps 64 in fixed attachment.

While the invention has been illustrated in two forms of different animals, it will be appreciated that the invention can be implemented in many different types of animals or in various types of mechanical objects and should not to be considered as limited to the two illustrated forms. Further, the types of movement and particularly parts of the animals that move can be varied as desired. Accordingly, it is intended that the invention not be limited to the specific disclosed embodiments but be interpreted within the spirit and scope of the appended claims.

What is claimed is:

1. An animated novelty device for mounting on a ball of a trailer hitch on a vehicle, the device comprising an electric motor for imparting motion to selected elements of the device, the motor being electrically connected to a brake light energizing line of the vehicle, whereby the selected elements of the device are set in motion by energizing the brake light energizing line, and a gear box attached to the electric motor, the gear box comprising a plurality of gears that provide movement to an output shaft, whereby the plurality of gears convert a rotation of a rotor of the electric motor to an appropriate speed and torque at the output shaft of the gear box to cause rotation of a drive wheel that has at least connection attached to the output shaft of the gear box, and whereby the drive wheel comprises an offset point through which a distal end of a lever arm is attached to the drive wheel and wherein a proximal end of the lever arm is connected to an offset point on a push and pull wheel, so as to create an oscillating motion of the push and pull wheel about a center point of the push and pull wheel.

2. The animated novelty device of claim 1 wherein the device is configured to resemble a fish with the trailer hitch ball in a mouth of the fish and the push and pull wheel is within a tail of the fish, wherein the tail of the fish waggles so that the fish has a swimming motion when the push and pull wheel oscillates.

3. The animated novelty device of claim 2, further comprising a self-latching hitch ball receiver attached within the mouth of the fish.

4. The animated novelty device of claim 1 wherein the device is configured to resemble a deer seated on the trailer ball hitch.

5. The animated novelty device of claim 4 wherein the motion imparted to the device comprises repetitive raising and lowering of the fore limbs of the deer.

6. The animated novelty device of claim 5, wherein the drive wheel has a pin extended from a radially outer edge of the drive wheel, having a first end of a connector arm rotatably coupled to the pin and a second end of the connector arm rotatably connected to a second pin that protrudes from a radially outer edge of the push and pull wheel being a second wheel, an axle is connected to the second wheel at a center of the second wheel, at one end of the axle and extends through the gear box, each end of the axle terminates at a pair of end caps, wherein the pair of end caps provide connection to the fore limbs of the deer, so that as the push and pull wheel is driven in oscillating motion, the fore limbs move up and down.

7. The animated novelty device of claim 2, wherein the drive wheel has an off-set point through which a lever arm having a first end is attached to the drive wheel and the lever arm has a second end attached, offset, to the push and pull wheel being a second wheel, the second wheel is connected to a plate that is a part of the push and pull wheel.

8. An animated decorative cover for a vehicle trailer hitch comprising: a cover shaped and colored to resemble an animatable object; a mounting device incorporated into the cover for enabling attachment of the cover to a vehicle trailer hitch; a gear box incorporated into the cover and an electric motor attached to the gear box for driving an output shaft of the gear box; an animated mechanism comprising a drive wheel coupled to the output shaft 48, a lever arm connected to the drive wheel at one location and the lever arm connected to a push and pull wheel at a second location for imparting an oscillation motion to the push and pull wheel to impart motion to at least a portion of the cover when the motor is energized; and a connector means connecting the electric motor to a brake light system of the vehicle for energizing the electric motor upon actuation of a brake system of the vehicle.

9. The decorative cover of claim 8 wherein the mounting device comprises a sleeve seated within the cover and adapted to fit over a ball of a trailer hitch.

10. The decorative cover of claim 9 wherein the sleeve includes an elastic fit for frictionally retaining the cover on the ball.

11. The decorative cover of claim 8 wherein the animatable object is an animal representation.

12. The decorative cover of claim 8 wherein the animatable object is a fish representation.

13. The decorative cover of claim 8 wherein the animatable object is a mechanical device representation.

* * * * *